United States Patent [19]
Pinsley

[11] 3,886,475
[45] May 27, 1975

[54] CLOSED CYCLE GAS DYNAMIC LASER

[75] Inventor: Edward A. Pinsley, North Palm Beach, Fla.

[73] Assignee: United Aircraft Corporation, East Hartford, Conn.

[22] Filed: Feb. 26, 1973

[21] Appl. No.: 336,000

[52] U.S. Cl. ............................. 331/94.5 P; 330/4.3
[51] Int. Cl. .............................................. H01s 3/04
[58] Field of Search.................... 331/94.5; 330/4.3; 165/111; 62/514

[56] References Cited
UNITED STATES PATENTS
3,668,549  6/1972  Biancardi et al................... 331/94.5

OTHER PUBLICATIONS
Hertzberg et al., AIAA paper No. 71-106, AIAA 9th Aerospace Sciences Meeting, New York, January, 1971, pp. 1-16.

Primary Examiner—Maynard R. Wilbur
Assistant Examiner—N. Moskowitz
Attorney, Agent, or Firm—Jack N. McCarthy

[57] ABSTRACT

The device includes a closed cycle gas dynamic laser wherein the lasing fluid is recirculated in a closed loop. The closed loop includes a nozzle array, a lasing cavity and a diffuser. The exit of the diffuser is connected to the inlet to the nozzle array with a fuel heat exchanger located in the lasing flow and a pumping means located between the heat exchanger and the nozzle array. To provide for cooling of the pumping means and to improve diffuser performance, gas bled from the diffuser is cooled by two heat exchangers and pumped into cooling passages in the pumping means. The heat exchangers for cooling the flow to the pumping means are located in series and carry fuel from a supply to an injector in said combustor and the heat exchanger in the lasing flow cools the fluid and carries the fuel from a supply to an injector in said combustor.

3 Claims, 1 Drawing Figure

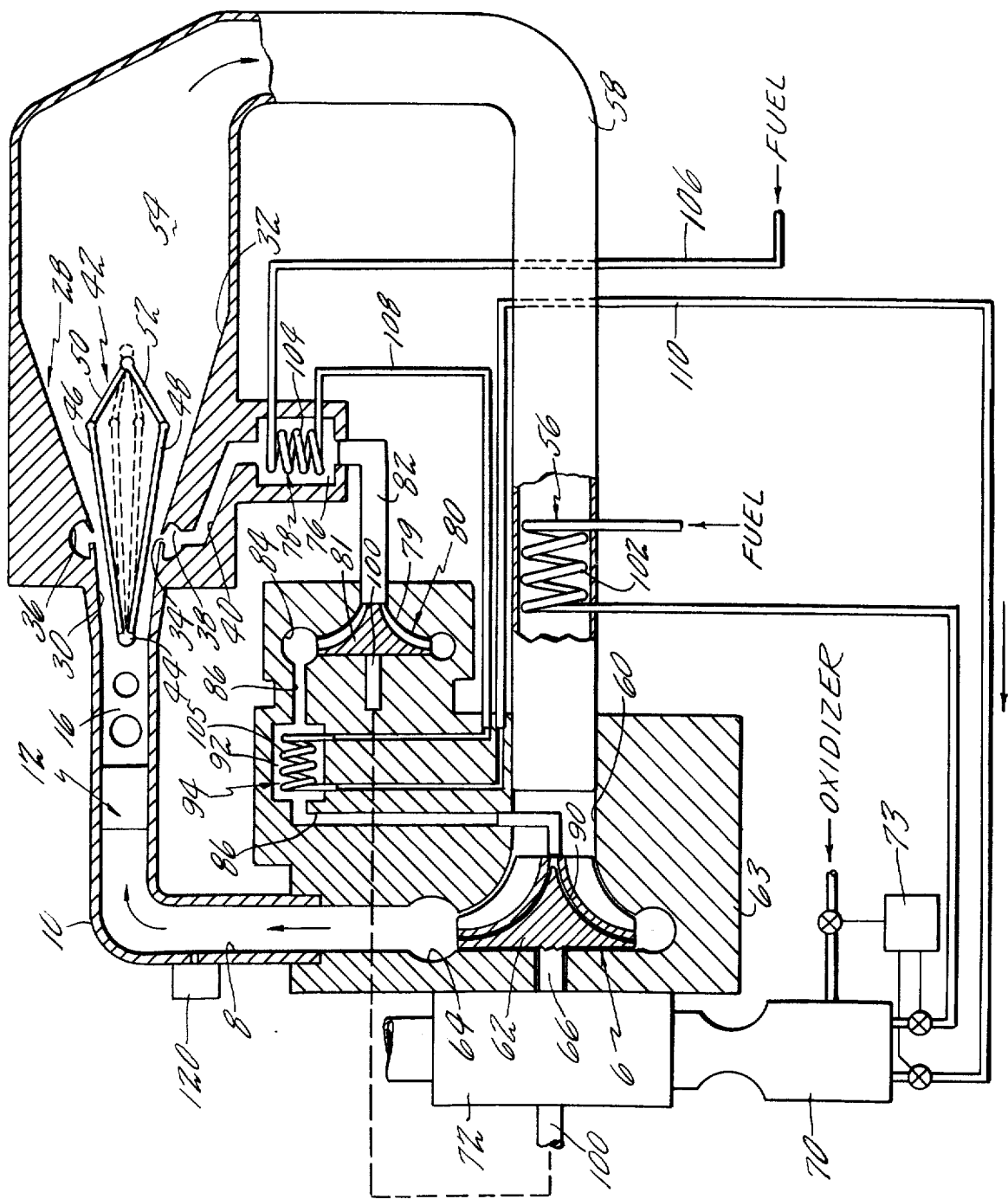

CLOSED CYCLE GAS DYNAMIC LASER

BACKGROUND OF THE INVENTION

This invention relates to gas dynamic lasers and particularly to their use in a closed cycle arrangement.

SUMMARY OF THE INVENTION

A primary object of the present invention is to provide a closed cycle system for a gas dynamic laser which is altitudeinsensitive and does not require a separate fluid cooling system to carry away waste heat.

In accordance with the present invention both the main flow and the diffuser bleed flow are cooled by fuel for the combustor which drives an expansion turbine. The fuel enters the heat exchangers as a high pressure liquid. The fuel oxidizer ratio of the expansion turbine is adjusted so that excess fuel can be employed to provide the required main loop cooling.

BRIEF DESCRIPTION OF THE DRAWING

The FIGURE is a schematic view of a closed cycle system.

DESCRIPTION OF THE PREFERRED EMBODIMENT

As shown in the FIGURE, the closed cycle system has a closed loop for the gaseous working fluid path with one lasing cavity therein for a laser beam. A main compressor and a bleed compressor circulate the fluid and provide the correct lasing gas temperatures and pressures such that after passing through the nozzle array, a population inversion will be achieved between the energy levels of one of the constituents of the lasing gas mixture. A lasing gas for this device could consist of carbon dioxide, nitrogen and water vapor in the composition ratio 14%, $CO_2$, 85% $N_2$, and 1% $H_2O$, but this system is not limited to this gas composition. See U.S. Pat. No. 3,665,336 in this regard. A compressor unit 6 supplies the gaseous working fluid at the proper temperature and pressure through conduit means 8 to a manifold 10. Manifold 10 directs the fluid to the inlet of nozzle means 12. A nozzle means of this type showing a plurality of small nozzles is disclosed in U.S. Pat. No. 3,602,432. The fluid is then expanded to a supersonic velocity through the nozzle means 12 to a laser cavity 16 which is downstream of the exit of the nozzle means.

The lasing cavity, or region 16 includes reflecting means to provide either self oscillation or amplification of a lowpower laser beam directed thereinto by another gas laser device. Application Ser. No. 772,072 filed Oct. 29, 1968 for a Closed Cycle Device to Lowell E. Ruby et al discloses such an arrangement in FIG. 2 thereof.

Many types of reflecting means can be used with an aerodynamic window providing for a beam outlet from the lasing cavity 16. An aerodynamic window of the type referred to is disclosed in U.S. Pat. No. 3,604,789.

The lasing fluid is then diffused to a low subsonic velocity and hence to a higher static pressure by a supersonic diffuser 28. The supersonic diffuser 28 is formed having first diverging walls 30 and second diverging walls 32. Boundary layer bleed openings 343 are provided along the walls of the diffuser where boundary layers may be expected to separate. These openings on one side are connected by a manifold 36 and on the other side by a manifold 38. These manifolds 36 and 38 are connected to a passageway 40 for a purpose to be hereinafter described. Bleed openings may also be provided for boundary layer removal along the end walls enclosing the diffuser.

A movable center body 42 is located in the diffuser having a fixed nose 44 with movable sides 46, 48, 50 and 52 forming a converging-diverging flow passage. Control means not shown moves the center body between its expanded (solid lines) position and its contracted (dotted lines) position. It can be seen that the narrow part of the diffuser moves from a point adjacent the intersection of the diverging wall 30 and exit of the lasing cavity to a point adjacent the intersection of the diverging walls 30 and 32 when the center body moves from a contracted position to an expanded position. The center body is positioned in its contracted position for starting the flow through the closed loop and it is moved to its expanded position for its designed flow. In addition to this means for changing the area of the diffuser, the area may be varied by translating the body, or plug, 42, or by moving the outer diffuser walls, 30 and 32.

The flow from the diffuser 28 enters a manifold 54 and is then directed to the inlet 60 of the compressor 6 by a conduit means 58. A heat exchanger 56 is located in the conduit means 58 to cool the fluid in said conduit for a purpose to be hereinafter disclosed. The compressor 6 consists of an impeller 62 mounted for rotation in a housing 63. The impeller contains cooling passages 90 which are supplied by cooling fluid as described hereinafter. The outlet of the compressor forms a manifold 64 which exits into the conduit means 8. A shaft 66 is connected to the impeller 62 and extends to the exterior of housing 63. The shaft 66 is driven through an expansion turbine 72. Hot, high pressure gases for the turbine are provided by a combustor 70 which has reactants, a fuel and an oxidizer, supplied thereto.

Passageway 40 leading from manifolds 36 and 38 is connected to a chamber 76 containing a heat exchanger 78, to cool the fluid in the passageway for a purpose to be hereinafter disclosed. Chamber 76 is connected to the inlet 79 of pump means 80 by conduit means 82. The exit of the pump means 80 comprises a manifold 84 which is connected to the impeller 62 by a conduit means 86 so that fluid leaving the pump means 80 is directed thereinto for cooling. In the embodiment shown, the cooling fluid flows through passages 90 which are formed in the impeller 62 and which discharges the fluid back into the system. While this is shown as being at the outlet of the impeller, holes can be made through to an intermediate position or positions in the impeller hub or blades for transpiration cooling of these components. A chamber 92 is located in conduit 86 and contains a heat exchanger 94 for a purpose to be hereinafter disclosed. The pump means 80 comprises an impeller 81 which is mounted in a housing which is schematically shown as part of housing 63. While compressor unit 6, pump means 80, and heat exchanger 94 are all schematically shown in one housing, it is to be understood that these units and the passageways connecting them can be located in any desirable manner in an actual construction such as providing for increased cycle efficiency, or accessability.

This impeller 81 is connected to a shaft 100 which extends externally of the housing of the pump means 80. This shaft is also driven by the expansion turbine 72. Appropriate means may be provided to correctly match the rotational speeds of turbine 72, impeller 62 and impeller 81. The control means for operating the combustor 70 in controlling the expansion turbine 72 to achieve proper rotation of the impellers 62 and 81 are not shown but are within the skill of the art. Control 73 regulates fuel and oxidizer flow to said combustor 70.

Heat exchanger 56 is shown as a helically wound pipe 102 and heat exchangers 78 and 94 are each shown as smaller helically wound pipes 104 and 105 respectively. Conduit means 106 directs a fuel to the helically wound pipe 104 while conduit means 108 interconnects pipe 104 to helically wound pipe 105. Pipe 105 is in turn connected to the fuel injecting means of combustor 70 through conduit means 110. The type and source of fuel for cooling these three exchangers do not form part of this invention. The heat exchangers 56, 78 and 94 cool the laser fluid to remove excess heat that was added by compressor means 62 and pump 80 over the amount of energy extracted in the lasing beam and heat dissipated to the environment. This waste heat is added regeneratively to the expansion turbine fuel thereby improving overall cycle efficiency and reducing the amount of fuel and oxidizer required to drive the expansion turbine. The gas temperature at the inlet of nozzle means 12 is regulated by varying the coolant flow rate in heat exchangers 78 and 94 and heat exchanger 56. This control can be manually operated or automatically controlled by sensing the gas temperature in manifold 10.

For starting, the system could be charged with gas from a storage container 120 containing gas of the correct composition for lasing, and during operation supplied therefrom with a small amount of makeup gas to overcome leakage and maintain proper cycle operation.

I claim:

1. A gas dynamic laser device having a closed cycle for the flow of a lasing fluid, said closed cycle including a supersonic nozzle means, a lasing region downstream of said nozzle means, reflecting means in said lasing region to form a lasing cavity, a diffuser means downstream of said lasing region, compressor means for delivering the lasing fluid to said supersonic nozzle and maintaining flow throughout the cycle, means for cooling said compressor means, said means for cooling said compressor means including first passage means for bleeding lasing fluid from said closed cycle, said compressor means having cooling passages therein, said first passage means being connected to said coolant passages, fluid pumping means in said first passage means, a first heat exchanger means located in said first passage means between said fluid pumping means and its connection for bleeding lasing fluid from said closed cycle for cooling said bled fluid, a second heat exchanger means located in said first passage means between said fluid pumping means and said compressor means for removing excess heat added by said fluid pumping means, a reactant supply, second passage means for directing the reactant from said supply to said first heat exchanger means for passage therethrough, third passage means for directing the reactant from said first heat exchanger means to said second heat exchanger means, an expansion turbine being connected to said compressor means for driving it, a combustor for flowing gases through said turbine, said combustor having injection means for receiving reactants, said reactants being a fuel and an oxidizer, fourth passage means for directing the reactant from said second heat exchanger means to the injection means of said combustor.

2. A gas dynamic laser device as set forth in claim 1 wherein a third heat exchanger means is located in the closed cycle for the flow of a lasing fluid, fifth passage means for directing the reactant from said reactant supply to said third heat exchanger means, sixth passage means for directing the reactant from said third heat exchanger means to the injection means of said combustor.

3. A gas dynamic laser device as set forth in claim 2 including means for varying the reactant flow rate in the first and second heat exchanger means and in the third heat exchanger means for regulating the temperature of the lasing fluid in the closed cycle.

* * * * *